F. H. BEACH, Jr.
MILKING PAIL.
APPLICATION FILED MAR. 9, 1908.

930,721.

Patented Aug. 10, 1909.
2 SHEETS—SHEET 1.

WITNESSES:
Osborne F. Gurney
Lattie Wood

INVENTOR:
Fred H. Beach, Jr.
BY W. H. Cooley
ATTY

F. H. BEACH, Jr.
MILKING PAIL.
APPLICATION FILED MAR. 9, 1908.
930,721.
Patented Aug. 10, 1909.
2 SHEETS—SHEET 2.
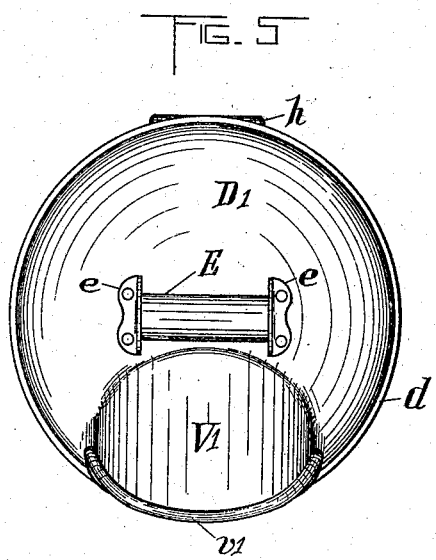
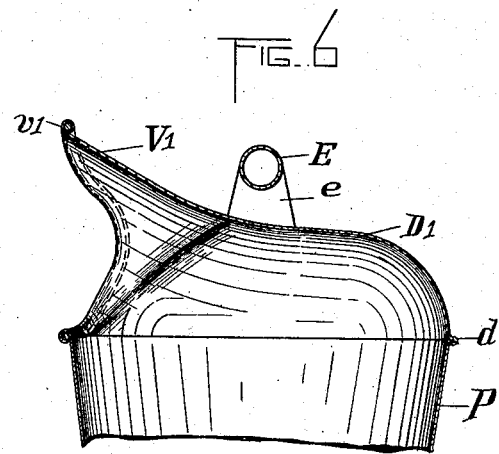
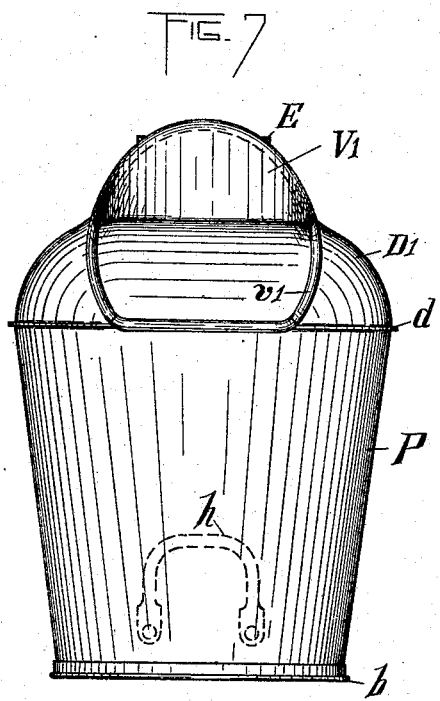
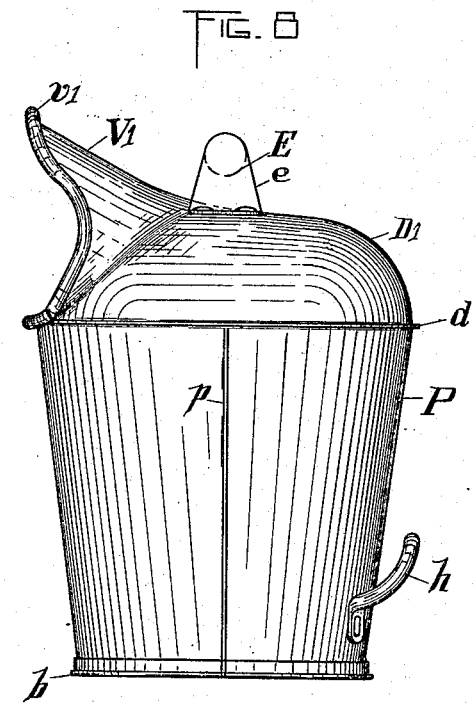
WITNESSES:
Osborne F. Gurney
Lottie Wood
INVENTOR:
Fred H. Beach, Jr.
By W. H. Cooley
ATTY.

UNITED STATES PATENT OFFICE.

FRED H. BEACH, JR., OF ROCHESTER, NEW YORK.

MILKING-PAIL.

No. 930,721. Specification of Letters Patent. Patented Aug. 10, 1909.

Application filed March 9, 1908. Serial No. 419,909.

*To all whom it may concern:*

Be it known that I, FRED H. BEACH, Jr., a citizen of the United States, and a resident of Rochester, in the county of Monroe and State of New York, have invented a new and Improved Milking-Pail, of which the following is a specification.

This invention relates to that class of pails adapted to use for milking purposes and has for its object the production of a pail adapted to more perfectly exclude dirt and germs when in use.

My invention comprises a milk pail, the side walls and the bottom of which may be of substantially the usual pattern, while the top or canopy section is curved so as to extend tangentially into the side walls. In this top or canopy section I provide a single opening and spout adapted to use both for milking and pouring and the side walls of the spout are so conformed as to prevent bodies falling in lines parallel to the axis of the pail from entering the pail through the opening in such spout. While the side walls of such a spout may be formed up separately and suitably secured to the top or canopy section, still, I prefer to form such canopy section and spout integrally.

Figure 1:
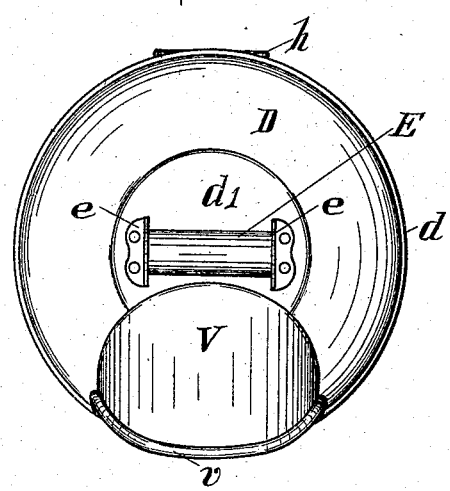
Figure 2:
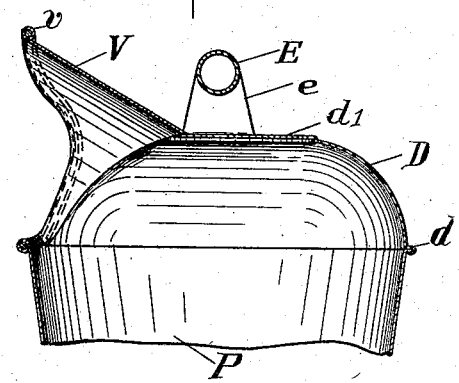
Figure 3:
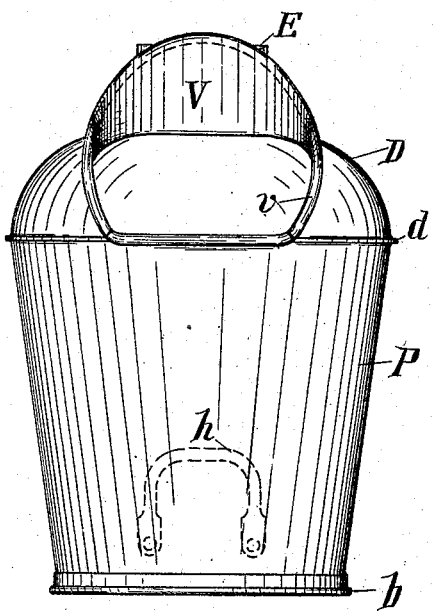
Figure 4:
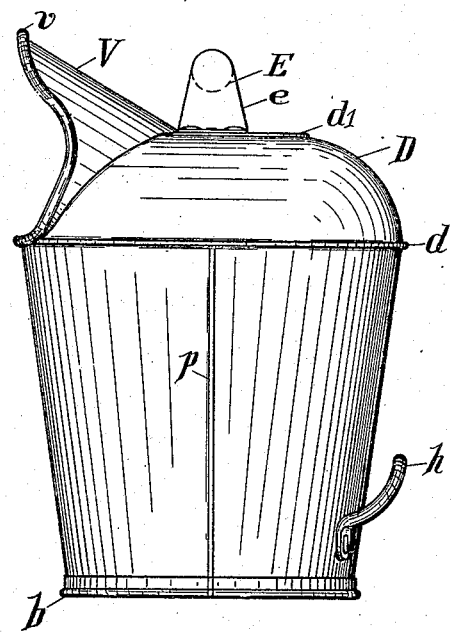

The accompanying drawings illustrating a milk pail in accordance with my invention are as follows:—Figure 1 is a top view of my milk pail, Fig. 2 is a vertical sectional view of the upper part thereof. Figs. 3 and 4 are side views of the pail with the spout opening turned respectively, toward the observer and to the left. Figs. 5, 6, 7 and 8 are views similar to Figs. 1, 2, 3 and 4, respectively, of that modification of my pail in which the spout is formed integrally with the top or canopy section.

Referring to the drawings,—P is the side wall of the pail which may be seamed, as seen at $p$, having the handle $h$ on the side thereof opposite the spout. The side walls terminate at the lower end in the usual reinforcing rim $b$.

Refer to Figs. 1, 2, 3 and 4,—A top or canopy section D is secured to the upper edge of the side walls and is so conformed, as seen, as to extend tangentially into the side walls of the pail. This top or canopy section D is flattened near its center, as seen at $d^1$, to receive the ears $e$ which are suitably riveted thereto and between which extends the body portion E of the handle, which I prefer to make use of. V is the spout inclosing the single opening in the pail which is used both for milking and in pouring out the contents of the pail. The outer edge of this spout V is formed up into a rim $v$ containing the usual reinforcing wire. The lower and horizontal portion of this spout V is preferably formed from the turned over edge of a part of the side wall of the pail P.

Refer to Figs. 5, 6, 7 and 8,—In that form of my milk pail shown therein, the canopy section $D^1$ extends integrally into the spout $V^1$, the outer edge of which is rolled up into a bead $v^1$ also reinforced, as indicated.

I desire to call attention to the fact that in using a milk pail constructed in accordance with my present invention the inwardly and rearwardly curved outer edge of the side walls of the spout V or $V^1$ affords ample space for the hands of a person milking the cow in such a way as to direct the milk into the pail through the opening in the spout, and also, to the fact that in a milk pail constructed as shown the entire interior surface of the pail is visible through the opening in the spout and while this is the case the construction of the outer edge of the side walls of the spout is such that bodies falling in lines parallel with the axis of the pail cannot enter the pail through the opening in the spout.

I may state that as the result of tests in the use of a milk pail constructed in accordance with my present invention as compared with a milk pail of the usual style, the bacterial cultures have been reduced from eight million per cubic centimeter for the common pail when used with an ungroomed cow to sixty-three thousand per cubic centimeter when a pail constructed in accordance with my invention was used under the same conditions, and as the result of similar tests in the case of a cow that had been brushed and washed from three hundred and sixty thousand bacterial cultures per cubic centimeter for the common pail to nineteen thousand when a pail constructed in accordance with my invention was used under the same conditions.

It is believed that from the foregoing description the construction, method of using and operation of my milking pail is sufficiently clear to call for no further explanation herein.

What I claim is:—

1. In a milk pail, in combination with the bottom and side walls thereof, a top or canopy section extending uninterruptedly around and joined to the side walls of the pail, such top or canopy section conformed to extend substantially tangentially into the side walls and a combined milking opening and pouring spout in such top or canopy section and near the joint between the same and the side walls of the pail, such spout having its outer edge conformed to prevent the entrance to the pail of bodies moving in lines parallel with the axis of the pail.

2. In a milk pail, in combination with the bottom and side walls thereof, a top or canopy section extending around and joined to the side walls of the pail, such top or canopy section conformed to extend substantially tangentially into the side walls and a combined milking opening and pouring spout in such top or canopy and near the joint between the same and the side walls of the pail, such spout having its outer edge conformed to prevent the entrance to the pail of bodies falling in lines parallel with the axis of the pail.

3. In a milk pail, in combination with the bottom and side walls thereof, a top or canopy section extending uninterruptedly around and joined to the side walls of the pail, such top or canopy section conformed to extend substantially tangentially into the side walls and a combined milking opening and pouring spout in such top or canopy and near the joint between the same and the side walls of the pail, such spout having its outer edge conformed to prevent the entrance to the pail of bodies moving in lines parallel with the axis of the pail, the entire inner surface of the pail visible through the opening in such spout.

4. In a milk pail, in combination with the bottom and side walls thereof, a top or canopy section extending around and joined to the side walls of the pail, such top or canopy section conformed to extend substantially tangentially into the side walls and a combined milking opening and pouring spout in such top or canopy and near the joint between the same and the side walls of the pail, such spout having its outer edge conformed to prevent the entrance to the pail of bodies falling in lines parallel with the axis of the pail, the entire surface of the pail visible through the opening in the spout.

5. In a milk pail, in combination with the bottom and side walls thereof, a top or canopy section extending uninterruptedly around and joined to the side walls of the pail, such top or canopy section conformed to extend substantially tangentially into the side walls and a combined milking opening and pouring spout in such top or canopy section and near the joint between the same and the side walls of the pail, such spout having its outer edge conformed to prevent the entrance to the pail of bodies moving in lines parallel with the axis of the pail, such milking and pouring spout formed integrally with the top or canopy section.

6. In a milk pail, in combination with the bottom and side walls thereof, a top or canopy section extending around and joined to the side walls of the pail, such top or canopy section conformed to extend substantially tangentially into the side walls and a combined milking opening and pouring spout in such top or canopy and near the joint between the same and the side walls of the pail, such spout having its outer edge conformed to prevent the entrance to the pail of bodies falling in lines parallel with the axis of the pail, such milking and pouring spout formed integrally with the top or canopy section.

7. In a milk pail, in combination with the bottom and side walls thereof, a top or canopy section extending uninterruptedly around and joined to the side walls of the pail, such top or canopy section conformed to extend substantially tangentially into the side walls and a combined milking opening and pouring spout in such top or canopy and near the joint between the same and the side walls of the pail, such spout having its outer edge conformed to prevent the entrance to the pail of bodies moving in lines parallel with the axis of the pail, the entire inner surface of the pail visible through the opening in such spout, such milking and pouring spout formed integrally with the top or canopy section.

8. In a milk pail, in combination with the bottom and side walls thereof, a top or canopy section extending around and joined to the side walls of the pail, such top or canopy section conformed to extend substantially tangentially into the side walls and a combined milking opening and pouring spout in such top or canopy and near the joint between the same and the side walls of the pail, such spout having its outer edge conformed to prevent the entrance to the pail of bodies falling in lines parallel with the axis of the pail, the entire inner surface of the pail visible through the opening in such spout, such milking and pouring spout formed integrally with the top or canopy section.

9. In a milk pail, in combination with the bottom and side walls thereof, a top or canopy section extending uninterruptedly around and joined to the side walls of the pail, such top or canopy section conformed to extend substantially tangentially into the side walls and a combined milking opening and pouring spout in such top or canopy section and near the joint between the same and the side walls of the pail, such spout having its outer edge conformed to prevent the entrance to the pail of bodies moving in lines parallel with the axis of the pail, the outer edge of such spout cut away at opposite points of its substantially horizontal diameter to afford space for the hands of the user in milking a cow, such milking and pouring spout formed integrally with the top or canopy section.

10. In a milk pail, in combination with the bottom and side walls thereof, a top or canopy section extending around and joined to the side walls of the pail, such top or canopy section conformed to extend substantially tangentially into the side walls and a combined milking and pouring spout in such top or canopy and near the joint between the same and the side walls of the pail, such spout having its outer edge conformed to prevent the entrance to the pail of bodies falling in lines parallel with the axis of the pail, the outer edge of such spout cut away at opposite points of its substantially horizontal diameter to afford space for the hands of the user in milking a cow, such milking and pouring spout formed integrally with the top or canopy section.

FRED H. BEACH, Jr.

Witnesses:
LOTTIE WOOD,
OSBORNE F. GURNEY.